3,391,214
ISOPRENE PRODUCTION FROM ISOPENTANE
VIA HYDROPEROXIDE
Lloyd C. Fetterly, Oakland, Calif., assignor to Shell Oil
Company, New York, N.Y., a corporation of Delaware
Filed June 12, 1967, Ser. No. 645,400
4 Claims. (Cl. 260—681)

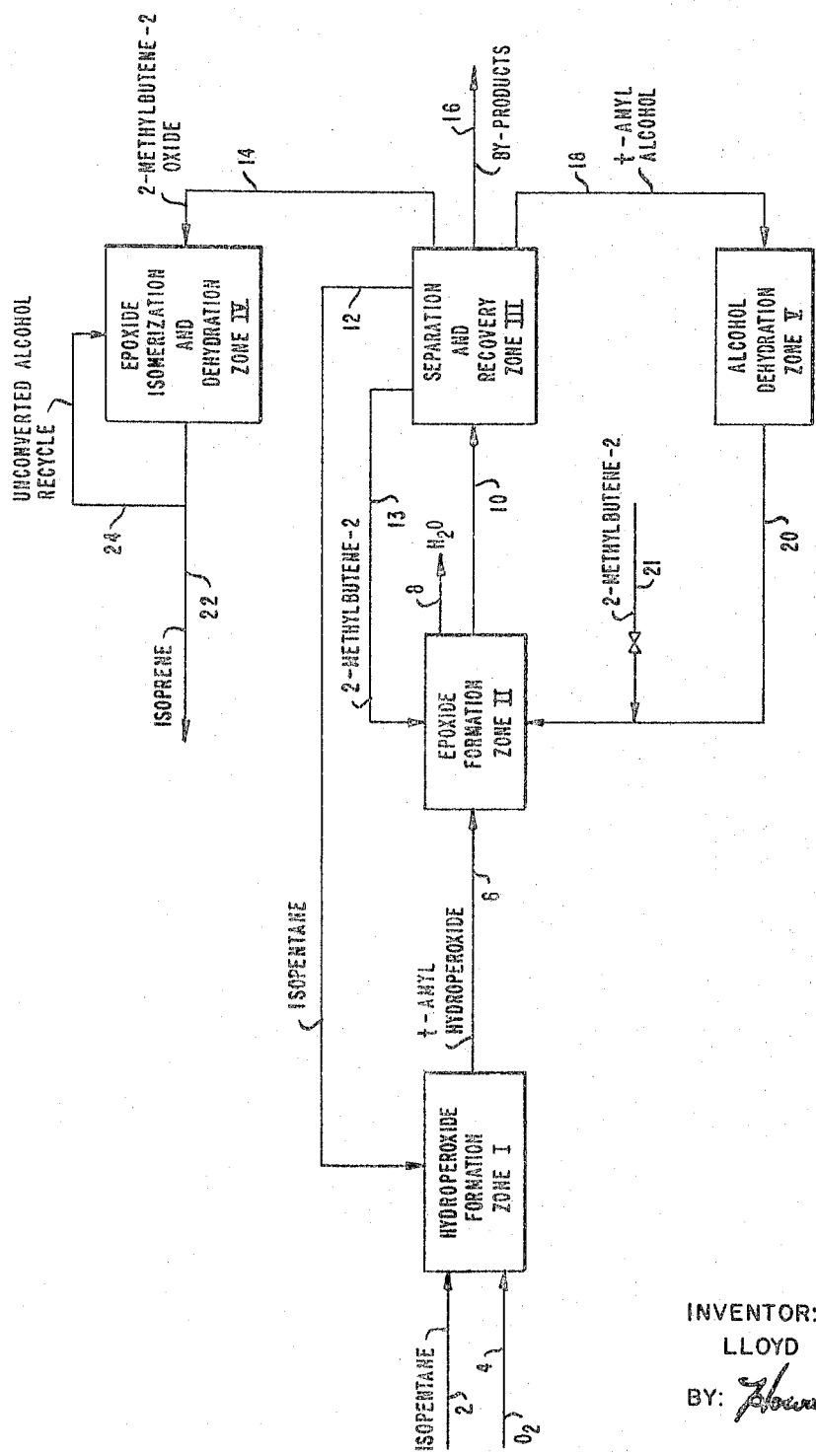

ABSTRACT OF THE DISCLOSURE

Tertiary amyl hydroperoxide produced by isopentane peroxidation is reacted with 2-methylbutene-2 to produce 2-methylbutene-2 oxide and tertiary amyl alcohol; the oxide is converted to isoprene, and the alcohol is converted to 2-methylbutene-2 to provide the 2-methylbutene-2 for reaction with the tertiary amyl hydroperoxide.

Background of the invention

Field of the invention.—Isoprene is of importance primarily because of its utility in the production of synthetic polyisoprene for which there is an increasing demand. The chemical industry's ability to expand production of isoprene is however faced with serious limitations, due particularly to the high cost of raw materials and of production generally encountered using the processes available heretofore. (An analysis of the problems facing current and potential producers of isoprene is found in the Apr. 3, 1967, issue of Chemical and Engineering News.)

Prior art.—One of the principal processes for producing isoprene is a catalytic dehydrogenation of isoamylene recovered from refinery streams. A few of the more pertinent catalysts for the process are described in the following United States patents: Eggertsen et al., No. 2,414,585, issued Jan. 21, 1947; Kleiber et al., No. 2,414,816, issued Jan. 28, 1947; and Kearby, No. 2,426,829, issued Sept. 2, 1947. Another commercial process comprises dimerization of propylene to 2-methyl-pentene-1, subsequent isomerization to 2-methylpentene-2 and pyrolysis of the 2-methylpentene-2 to isoprene and methane. Yet another process comprises (1) peroxidizing in a first oxidation zone ethylbenzene to methyl benzyl hydroperoxide (2) epoxidizing in a second oxidation zone 2-methylbutene-2 with the methyl benzyl hydroperoxide to produce 2-methylbutene-2 oxide and methyl benzyl alcohol and (3) separating the 2-methylbutene-2 oxide and subsequently isomerizing and dehydrating the oxide to isoprene, as disclosed by Netherlands patent application No. 6,608,484 of Halcon International, filed June 17, 1966. The usefulness of this process, however, is severely limited by the fact that it requires the use of ethylbenzene as a reactant and that the ethylbenzene is converted to methyl benzyl alcohol which must be reconverted to more useful materials or recovered as a by-product.

The invention

It has now been found that isoprene can be produced from isopentane and oxygen in an improved, cyclic-type, integrated process according to the following overall net reaction

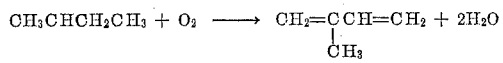

Briefly stated, the cyclic-type process of the invention comprises the steps of (1) oxidizing isopentane with an oxygen-containing gas to produce tertiary amyl hydroperoxide (2) reacting the hydroperoxide with 2-methylbutene-2, optionally in the presence of a metal compound oxidation catalyst, to produce 2-methylbutene-2 oxide and tertiary amyl alcohol (3) catalytically isomerizing and dehydrating the 2-methylbutene-2 oxide to isoprene and (4) dehydrating the tertiary amyl alcohol over a suitable dehydration catalyst to produce 2-methylbutene-2 for recycle to step (2).

Brief description of the drawing

For a better understanding of the invention, recourse is had to the accompanying drawing wherein the sole figure is a schematic flow diagram showing one form of the apparatus suitable for carrying out the invention. In the drawing, I designates a hydroperoxide formation zone, II an epoxide formation zone, III a separation and recovery zone, IV an epoxide isomerization and dehydration zone and V an alcohol dehydration zone. For convenience and clarity, parts of apparatus not essential to a complete understanding of the invention such as means for providing heat, refrigeration, stirring, pressure control, cooling, separations, and the like have been omitted from the drawing. The location of such means will be apparent to one skilled in this art.

With reference to the drawing: isopentane is charged through line 2 to an oxidation zone designated as hydroperoxide formation zone I, maintained at hydroperoxide forming conditions of temperature and pressure. An oxygen-containing gas is introduced through line 4. Resulting tertiary amyl hydroperoxide, together with unreacted isopentane, is passed by line 6 to an epoxide formation zone II wherein it is reacted with 2-methylbutene-2. Water produced during the epoxidation is removed by line 8. The remaining oxidation mixture is removed through line 10 to a separation and recovery zone III. Hydrocarbons comprising isopentane are recycled through line 12 to the hydroperoxide formation zone I. Unreacted 2-methylbutene-2 is recycled through line 13 to epoxide formation zone II. 2-methylbutene-2 oxide product is recovered and passed through line 14 to an epoxide isomerization and dehydration zone IV for further processing to isoprene. Any by-products are removed by line 16. Remaining liquid components of the oxidation mixture consisting essentially of tertiary amyl alcohol are passed through line 18 to an alcohol dehydration zone V for conversion to 2-methylbutene-2 which is recycled by line 20 to the epoxide formation zone II. Line 21 is provided for introducing 2-methylbutene-2 from an outside source into line 20 leading into the epoxidation zone II when starting up the process. Once underway, such introduction is stopped and the necessary 2-methylbutene-2 reactant is continuously made available by tertiary amyl alcohol dehydration carried out in dehydration zone V. Isoprene formed in the epoxide isomerization and dehydration zone IV is withdrawn by line 22. Charge to zone IV unconverted therein may be recycled thereto by line 24.

Description of preferred embodiments

Hydroperoxide formation zone.—In the first oxidation zone of the process of the invention isopentane is peroxidized to tertiary amyl hydroperoxide with molecular oxygen. The molecular oxygen is charged as such or it may be diluted with an inert gas such as nitrogen or argon. One oxygen-containing gas suitably employed is air, preferably diluted with additional inert gas. Particularly preferred for use in the reaction is molecular oxygen, especially at about 1% to about 20% volume concentration in an inert gas such as nitrogen.

The peroxidation reaction is autocatalytic, i.e., oxidation of isopentane takes place when isopentane is brought into contact with oxygen and is generally carried out without the aid of catalysts. However, it is within the scope of the invention to employ heavy-metal oxidation catalysts such as compounds of manganese, cobalt, vanadium, tungsten, molybdenum, and particularly the salts of such metals with an organic acid, such as the naphthenates, oleates, and acetates. When employed, amounts of catalyst up to about 1% by weight of isopentane are satisfactory.

The oxidation is conducted in the presence or in the absence of added reaction solvent. Suitable solvents comprise those heretofore employed in liquid phase alkane oxidations, e.g., they are high boiling, substantially chemically inert and thermally stable. Suitably employed solvents include fully esterified polyacyl esters of polyhydroxyalkanes such as glycerol triacetate, tetraacyl esters of erythritol, diethylene glycol diacetate; haloaromatics such as chlorobenzene, bromobenzene and dichlorobenzene; and organic nitriles such as acetonitrile, propionitrile and adiponitrile. The isopentane reactant is itself an appropriate solvent or diluent, and often the presence of an additional solvent or diluent is preferably avoided.

The reaction is conducted under conditions whereby at least a substantial part of the isopentane is maintained in the liquid phase, and is suitably conducted in a batch-wise manner as by charging the isopentane, an oxygen-containing gas, and catalyst, if any is employed, to an autoclave or similar reactor and maintaining the mixture at reaction temperature. In an alternate modification, the oxygen-containing gas is continuously added to the remaining reaction mixture components. In yet another modification, the reaction is conducted in a continuous manner as by contacting the reactants during passage through a tubular reactor.

Reaction conditions preferably employed, e.g., reaction time, temperature, and pressure, will in part be dependent upon the oxygen-containing gas used, the oxygen partial pressures, and whether or not an oxidation catalyst is employed. Temperatures up to about 200° C. are satisfactory. Generally temperatures from about 50° C. to about 150° C. are preferred, with best results obtained at temperatures from about 100° C. to about 140° C. Total reactor pressures sufficient to maintain at least a substantial part of the reactant in the liquid phase are generally satisfactory, but higher or lower pressures may be employed if desired. Reactor pressures may vary from about 15 p.s.i.g. to about 2000 p.s.i.g.; pressures from about 100 p.s.i.g. to about 900 p.s.i.g. being preferred. In general, molecular oxygen partial pressures may vary from about 2 p.s.i.g. to about 200 p.s.i.g. with partial pressures of about 10 p.s.i.g. to about 100 p.s.i.g. being preferred. The oxygen partial pressures normally correspond to from about 1% to about 20% of the volume concentration of the total gaseous mixture. It is, of course, appreciated that the oxygen concentration is always adjusted to avoid explosive mixtures within the reactor.

Reaction time will vary depending upon the extent of hydroperoxide formation desired. Generally, conversions of isopentane to hydroperoxide of from about 5% to about 30% on a molar basis, are maintained. Higher or lower conversions, however, may be maintained within the scope of the invention.

The resulting hydroperoxide product containing reaction mixture, preferably freed of oxygen-containing gas, may be charged as such for the epoxidation of 2-methyl-butene-2 and concomitant formation of tertiary amyl alcohol. It is, however, often found advantageous to concentrate the hydroperoxide product, e.g., as by removing at least a part of the unreacted isopentane by conventional methods, such as distillation, evaporation, etc.

The hydroperoxide product comprises principally tertiary amyl hydroperoxide because of the selectivity of oxygen attack at tertiary C—H linkage as compared to secondary and primary C—H linkages. Oxidation of the isopentane will, however, also give lesser amounts of secondary amyl hydroperoxide, e.g.

$(CH_3)_2CHCH(OOH)CH_3$

This will not be found to be detrimental since the secondary hydroperoxide oxidizes 2-methylbutene-2 to the epoxide with the same efficiency as the tertiary hydroperoxide. In addition, secondary amyl alcohol product formed from the secondary hydroperoxide will dehydrate at least in part to give predominantly 2-methylbutene-2, useful for recycle in the epoxidation reaction.

Epoxide formation zone.—In the second oxidation zone of the process of the invention, tertiary amyl hydroperoxide is reacted with 2-methylbutene-2 to produce 2-methylbutene-2 oxide and tertiary amyl alcohol.

The epoxidation reaction is optionally carried out in the presence of catalytic amounts of metal compounds of metals of the 4th, 5th, and 6th Periods of the Periodic Table such as titanium, vanadium, zirconium, niobium, cobalt, molybdenum, hafnium, tantalum, tungsten and rhenium. Examples of metal compounds which are suitably employed as catalysts in the epoxidation include their oxides, including heteropoly acids and hydrated oxides; acids, salts with organic acids; hydroxides; inorganic salts such as halides, sulfates, nitrates; organic complexes; and carbonyls. Suitable oxides include vanadium pentoxide, niobium pentoxide, tantalum pentoxide, zirconium dioxide hydrate, and heteropoly acids such as tungstovanadic acid and molybdovanadic acid. Typical acids are molybdic acid and tungstic acid. Typical acid salts are sodium orthovanadate and ammonium metavanadate, while typical organic esters of the acids are vanadic esters desirably alkyl esters, e.g., n-butyl or n-heptyl vanadates or orthotitanate esters of which a specific example is tetra n-butyl orthotitanate. Typical salts salts of organic acids comprise vanadium naphthenate, molybdenum naphthenate, vanadium stearate, molybdenum stearate, and vanadium oleate. Typical inorganic salts are vanadic sulfate $V_2(SO_4)_3$, vanadium halides, e.g., $VCl_3$, zirconium nitrate or sulfate and particularly oxy-salts such as vanadyl sulfate $VOSO_4$ or vanadium oxychloride $VOCl_3$. Suitable organic complexes include vanadium, vanadyl or molybdenyl acetylacetonates, vanadium-containing complexes of quinoline, 8-hydroxy-quinoline, and phthalocyanins. Suitable carbonyls are molybdenum hexacarbonyl and tungsten hexacarbonyl. Mixtures of two or more of such catalysts are often employed with advantage. Those comprising vanadium, molybdenum, tungsten, and mixtures thereof are preferred. Particularly preferred are vanadium naphthenate, molybdenum, naphthenate, tungstic acid and molybdic acid. The amount of the actalyst used may vary. Generally amounts of catalysts up to about 1% by weight of 2-methylbutene-2 are satisfactory although amounts up to only 0.1% by weight on the same basis are preferred.

The suitable catalysts, if used, may be employed with or without a suitable carrier, e.g., pumice, kiselguhr, silica gel, alumina, etc.

Generally, the isopentane, or any solvent or diluent contained in the hydroperoxide reaction mixture, may function as solvent or diluent for the epoxidation of 2-methylbutene-2 without the need of any additional cosolvent or diluent. However, it is within the scope of the process of the invention to employ additional solvents or diluents in the epoxidation reaction. Suitable solvents are those which are liquid at reaction temperatures and pressures, are capable of dissolving the reactants and catalysts, and are inert to the reactants and the products produced therefrom. Illustrative suitable solvents are oxygen-containing solvents such as ethers, e.g., dibutyl ether, diethylene glycol, dioxane and tetrahydrofuran, the esters including butyl propionate and phenyl acetate, and ketones such as acetone and methyl isobutyl ketone, alcohols, such as methanol and t-butyl alcohol; as well as nitrogen-containing solvents including nitriles such as acetonitrile, dialkylamides such as dimethylformamide, heterocyclic bases such as pyridine. Other suitable inert solvents include mononuclear aromatics such as benzene, toluene, chlorobenzene, and dichlorobenzene, and alkanes such as octane, decane, and dodecane.

In the epoxidation reaction, the molar ratio of the 2- methylbutene-2 to tertiary amyl hydroperoxide is at least stoichiometric although molar ratios of the olefin to the hydroperoxide up to as high as 100:1 may be used. Generally, the molar ratios of olefin to hydroperoxide varying from 20:1 to about 1:1 are satisfactory, with best results being obtained with molar ratios of about 10:1 to about 2:1.

The process of the invention is not limited with respect to the method of contacting the hydroperoxide mixture with the 2-methylbutene-2 and the catalyst optionally employed. The epoxidation reaction is executed at an elevated temperature, for example, up to about 200° C. At substantially higher temperatures, decomposition, polymerization or excessive oxidation side reactions occur, detracting from the desired yield of the epoxide. In general, temperatures of from about 20° C. to about 150° C. are satisfactory although temperatures of about 50° C. to about 120° C. are generally preferred. Atmospheric or superatmospheric pressures are suitably employed provided that at least a substantial part of the reaction mixture is maintained in liquid phase. Pressures about atmospheric to about 1000 p.s.i.g. will be found suitable.

The product mixture formed in the epoxidation zone, comprising 2-methylbutene-2 oxide and tertiary amyl alcohol, as well as some unreacted 2-methylbutene-2 and isopentane is passed to the separation and recovery zone III.

It should be pointed out that by control of reaction conditions within the epoxide formation zone II, dehydration of tertiary amyl alcohol may be caused to take place to at least a substantial degree within this zone thereby reducing materially the amount of this component in the effluence from this zone will commensurate increase in 2-methylbutene-2 oxide content.

The separation and recovery zone.—The separation and recovery zone III may comprise suitable fractionation or similar conventional separating means wherein the reaction mixture emanating from the epoxidation zone is separated into desired component fractions. An isopentane fraction is separated therein and recycled to the hydroperoxide formation zone. Unreacted 2-methylbutene-2 is separated and recycled to the epoxide formation zone. 2-methylbutene-2 oxide is separated and passed to an isomerization and dehydration zone for conversion to isoprene. Tertiary amyl alcohol is separated and passed to a dehydration zone wherein the alcohol is converted to 2-methylbutene-2 for recycle to the epoxide formation zone. Catalyst, or catalyst components, are separated and recycled to the epoxidation.

Amyl alcohol dehydration zone.—The tertiary amyl alcohol may be dehydrated over a variety of catalysts to produce almost exclusively 2-methylbutene-2 for recycle to the epoxidation reaction. This recycle provides the essential 2-methylbutene-2 reactant once the process is under way. A small amount of secondary amyl alcohol produced from minor amounts of secondary amyl hydroperoxide formed in the molecular oxygen oxidation of isopentane can, if desired, be dehydrated in the same reaction to produce 2-methylbutene-2 and minor amounts of 2-methylbutene-3.

Suitable catalysts for the dehydration reaction are solid inorganic acidic acting catalysts. Illustrative solid inorganic acidic catalysts are inorganic acidic oxides such as alumina, tungsten oxide and thoria, and siliceous refractory oxides. Suitable siliceous refractory oxides include synthetic composites as well as acid-treated clays and similar materials such as crystalline aluminosilicates known in the art as molecular sieves. In general, synthetic siliceous catalysts are preferred over naturally occurring materials or molecular sieves, and exemplary preferred synthetic siliceous catalysts include silica-alumina, silica-magnesia, silica-alumina-titania, silica-alumina-zirconia, silica-titania-zirconia, silica-magnesia-alumina and the like. Acidic inorganic catalysts particularly preferred for use are the acidic metal oxides, especially alumina. The suitable acidic catalysts may be employed in admixture with suitable solid support or diluent materials such as diatomaceous earth, pumice, clays and other various inert silicates.

Dehydration of the amyl alcohol is conducted at elevated temperatures. The specific temperature preferably used will depend on the particular catalyst used and is suitably within the range of about 100° C. to about 300° C. Temperatures of about 125° C. to about 250° C. are generally preferred. Pressures may vary for example from about 15 p.s.i.g. to about 1000 p.s.i.g. although reaction pressures from about 100 p.s.i.g. to about 700 p.s.i.g. will generally be preferred.

Inert materials capable of acting as solvents and/or diluents, for example, saturated alkanes of straight chain or cyclic structure such as octane, cyclohexane, and decahydronaphthalene, and the like may optionally be employed but are not essential. It is preferred, however, that the reaction be conducted in a substantially inert reaction environment, that is, in the substantial absence of reactive materials such as oxygen. The reaction product is principally 2-methylbutene-2 with minor amounts of 2-methylbutene-3. The resulting reaction mixture is separated by conventional means such as a fractional distillation, selective extraction and the like.

Epoxide isomerization and dehydration zone.—The final stage of the integrated cyclic-type process comprises the conversion of 2-methylbutene-2 oxide to isoprene by the successive or conjoint steps of isomerization of 2-methylbutene-2 oxide to the allylic alcohol form which is dehydrated to isoprene. Catalysts suitably used for the simultaneous isomerization and dehydration comprise acidic-type catalyst such as acidic metal oxides, siliceous refractory oxides, alkali and alkaline earth metal phosphates. Illustrative acidic metal oxides include alumina, chromia, thoria, and titania; illustrative siliceous refractory oxides include silica-alumina, silica-magnesia, silica-titania and silica-magnesia-zirconia; and illustrative alkali and alkaline earth phosphates are lithium phosphate and magnesium phosphate. A particularly preferred catalyst comprises thoria.

The concurrent isomerization and dehydration of the 2-methylbutene-2 oxide is preferably conducted in the fluid phase with or without the presence of an added diluent or solvent. When a diluent is employed, the diluent is preferably an aliphatic, aromatic or cycloaliphatic hydrocarbon which is free from any substantial amount of non-aromatic unsaturation and which is fluid at the reaction temperatures and pressures employed. Suitable aliphatic hydrocarbon solvents comprise alkanes of straight chain and cyclic structure such as isopentane, hexane, octane, isooctane, decane, cyclohexane, cyclopentane, methylcyclopentane, Decalin®, etc.; mononuclear aromatic hydrocarbons such as benzene, toluene, xylene and ethylbenzene, etc. are at times employed with advantage.

Operation of the 2-methylbutene-2 oxide conversion to isoprene may be carried out in any suitable manner. In one method of operation the liquid mixture is passed in a continuous stream through a column packed with the catalyst. The reaction mixture may suitably be passed downwardly through a vertical column containing the catalyst in the form of a stationary bed. Suitable reaction conditions comprise the use of elevated temperature and pressure. Temperatures employed will depend to some extent on the particular catalyst used. In general, temperatures of from about 200° C. to about 400° C., more preferably from about 250° C. to about 350° C., are employed. Suitable pressures vary from about 15 p.s.i.g. to about 1000 p.s.i.g. Reaction pressures from about 20 p.s.i.g. to about 200 p.s.i.g. are preferred. Reaction products obtained are separated in suitable separating means and the desired isoprene product recovered. Conventional methods such as fractional distillation, selective extraction, and the like, may be employed in the product separation and recovery operation.

The separate stages of the integrated process may be carried out batchwise, intermittently or continuously. The process lends itself with particular advantage to continuous operation. The invention is not limited with respect to the specific apparatus, such as reaction chamber, and the like, employed in the execution of the individual integrated steps.

To further illustrate the process of the invention, the following examples are provided. It should be understood that the details thereof are not to be regarded as limitations, as they may be varied as will be understood by one skilled in this art.

EXAMPLE I

Isopentane is charged to a first stainless-steel reactor, designated in the drawing as hydroperoxide formation zone I. The first reactor is heated to 125° C. with an electrical resistance heating jacket. Air is charged to the reactor pressure to 400 p.s.i.g. The reactor is maintained at a temperature of 125° C. and an oxygen partial pressure of about 50 p.s.i.g. until about 15% of the isopentane is converted to hydroperoxides.

The resulting tertiary amyl hydroperoxide containing liquid product mixture is then passed to a second reactor (designated at the epoxide formation zone II) to which is also charged 2-methylbutene-2 and molybdic acid. A molar ratio of 2-methylbutene-2 to hydroperoxide of 5:1 is maintained with a catalyst concentration of 0.1% by weight of total reaction mixture. The reactor is maintained at a temperature of 110° C. and a pressure of 300 p.s.i.g. After 1.5 hours, reaction of tertiary amyl hydroperoxide with 2-methylbutene-2 is substantially complete.

The resulting mixture consisting predominantly of 2-methylbutene-2 oxide in admixture with 2-methylbutene-2, isopentane and tertiary amyl alcohol is fractionated on a multiplate column. An isopentane fraction, B.P. 27–30° C., and a 2-methylbutene-2 fraction, B.P. 37–39° C., are separated. The 2-methylbutene-2 fraction is recycled to the second reactor II and the isopentane fraction is recycled to the first oxidation reactor I. Also separated during the fractionation are: a 2-methylbutene-2 oxide fraction B.P. 70–78° C., a tertiary amyl alcohol fraction, B.P. 82–84° C. and a secondary amyl alcohol fraction, B.P. 99–102° C. A yield of 2-methylbutene-2 oxide of 72.4% based on the hydroperoxide charged thereto is obtained in the second reactor II. The yields of tertiary amyl alcohol and of secondary amyl alcohol in the second reactor II are 92.1% and 5%, respectively, based on the hydroperoxide charged thereto.

The 2-methylbutene-2 oxide fraction is isomerized and dehydrated in the presence of thoria in a third reactor indicated in the drawing as epoxide isomerization and dehydration zone IV, at a temperature of 300° C. and a pressure of 80 p.s.i.g., with a contact time of 1–3 min. Isoprene is separated by fractional distillation from the resulting reaction mixture. The yield of isoprene obtained in the third reactor (zone IV) is 90% based on the 2-methylbutene-2-oxide charged thereto. This represents an overall conversion of isopentane charged to isoprene of 69.5%.

The tertiary amyl alcohol fraction separated from the epoxidation reaction mixture is subjected to dehydration in the presence of alumina at 165° C. The resulting dehydration products consisted essentially of 2-methylbutene-2 95%; 2-methylbutene-3 1.5%, and 2-methylbutene-1 3.5% which mixture is recycled to the second oxidation reactor II.

EXAMPLE II

In a repetition of the operation under substantially identical conditions as used in the foregoing Example I, but with the exception that no catalyst was employed in the second reactor wherein the amyl hydroperoxide is reacted with 2-methylbutene-2, the overall isopentane conversion to isoprene obtained is 38%.

I claim as my invention:

1. A process for the production of isoprene consisting essentially of:
   (a) reacting tertiary amyl hydroperoxide in an oxidation zone with 2-methylbutene-2 obtained within the system, thereby forming a reaction mixture comprising 2-methylbutene-2 oxide and tertiary amyl alcohol in said oxidation zone;
   (b) separating a fraction comprising tertiary amyl alcohol and a fraction comprising 2-methylbutene-2 oxide from the effluence from said oxidation zone;
   (c) dehydrating said fraction comprising tertiary amyl alcohol to a dehydration mixture comprising 2-methylbutene-2;
   (d) recycling said dehydration mixture to said oxidation zone to be used therein as said 2-methylbutene-2 obtained within the system; and
   (e) converting said fraction comprising 2-methylbutene-2 oxide to a reaction mixture comprising isoprene.

2. The process in accordance with claim 1 wherein said conversion of said fraction comprising 2-methylbutene-2 oxide to a reaction mixture comprising isoprene is effected in the presence of a catalyst selected from the group consisting of acidic metal oxides, siliceous refractory oxides, alkali metal phosphates and alkaline earth metal phosphates.

3. The process in accordance with claim 1 wherein said dehydration of said fraction comprising tertiary amyl alcohol is effected in the presence of a catalyst selected from the group consisting of acidic metal oxides and siliceous refractory oxides.

4. The process in accordance with claim 1 wherein said reaction of tertiary amyl hydroperoxide with 2-methylbutene-2 is effected in the presence of an oxidation catalyst comprising vanadium, tungsten or molybdenum.

References Cited

UNITED STATES PATENTS

| | | | |
|---|---|---|---|
| 3,068,291 | 12/1962 | Amir | 260—593 |
| 3,355,505 | 11/1967 | Tedeschi | 260—642 |
| 3,360,584 | 12/1967 | Kollar | 260—681 |
| 3,360,585 | 12/1967 | Winnick | 260—681 |

OTHER REFERENCES

"Hydroperoxides Give Olefins," Chem. Eng. News, p. 17 (Apr. 10, 1967).

DELBERT E. GANTZ, *Primary Examiner.*

G. E. SCHMITKONS, *Assistant Examiner.*